United States Patent [19]
Deibert

[11] 4,289,970
[45] Sep. 15, 1981

[54] WIND POWERED ELECTRICAL GENERATOR

[76] Inventor: David D. Deibert, 1524 Grasshopper Rd., Huntingdon Valley, Pa. 19006

[21] Appl. No.: 962,957

[22] Filed: Nov. 22, 1978

[51] Int. Cl.³ ............................................. F03D 9/00
[52] U.S. Cl. ...................................... 290/44; 416/41; 416/153; 416/189; 416/DIG. 4
[58] Field of Search ...................... 290/44, 55; 416/35, 416/40, 41, 46, 48, 153, 155, 174, 189 A, 121 A, 126

[56] References Cited

U.S. PATENT DOCUMENTS

| | | | |
|---|---|---|---|
| 1,233,232 | 7/1917 | Heyroth | 290/44 |
| 3,635,583 | 1/1972 | Chilman | 416/48 |
| 3,637,323 | 1/1972 | Chilman | 416/153 |
| 3,740,565 | 6/1973 | Wesley | 290/44 |
| 4,160,170 | 7/1979 | Harner et al. | 416/41 |

*Primary Examiner*—J. D. Miller
*Assistant Examiner*—Donald L. Rebsch
*Attorney, Agent, or Firm*—Walter B. Udell

[57] ABSTRACT

A wind powered electrical generator having a rotatable wind wheel (21) carrying one of the armature (42) or field structures and a plurality of windvanes (45) connecting the rim to a central shaft (28), a stator (39) carrying the other of the armature or field structures, and a supporting structure (22) for the windwheel rotor shaft and the stator. The armature winding is carried by the windwheel at its perimeter, and the field structure is a ring structure which lies just radially outward of the armature winding and is carried by the fixed housing structure which perimetrally surrounds the windwheel. Bearing support (48) provided at the perimeter of the windwheel by low friction bearings carried by the fixed housing structure minimizes bearing stresses developed at the supporting shaft under wind loading conditions. The electical output of the generator is compared against a reference standard to generate corrective error signals when the phase of the generated electrical signal differs from that of the reference standard. Corrective mechanisms utilized are means for changing the angle presented by the windwheel blades to the wind; a braking structure; and a feedback field winding.

23 Claims, 13 Drawing Figures

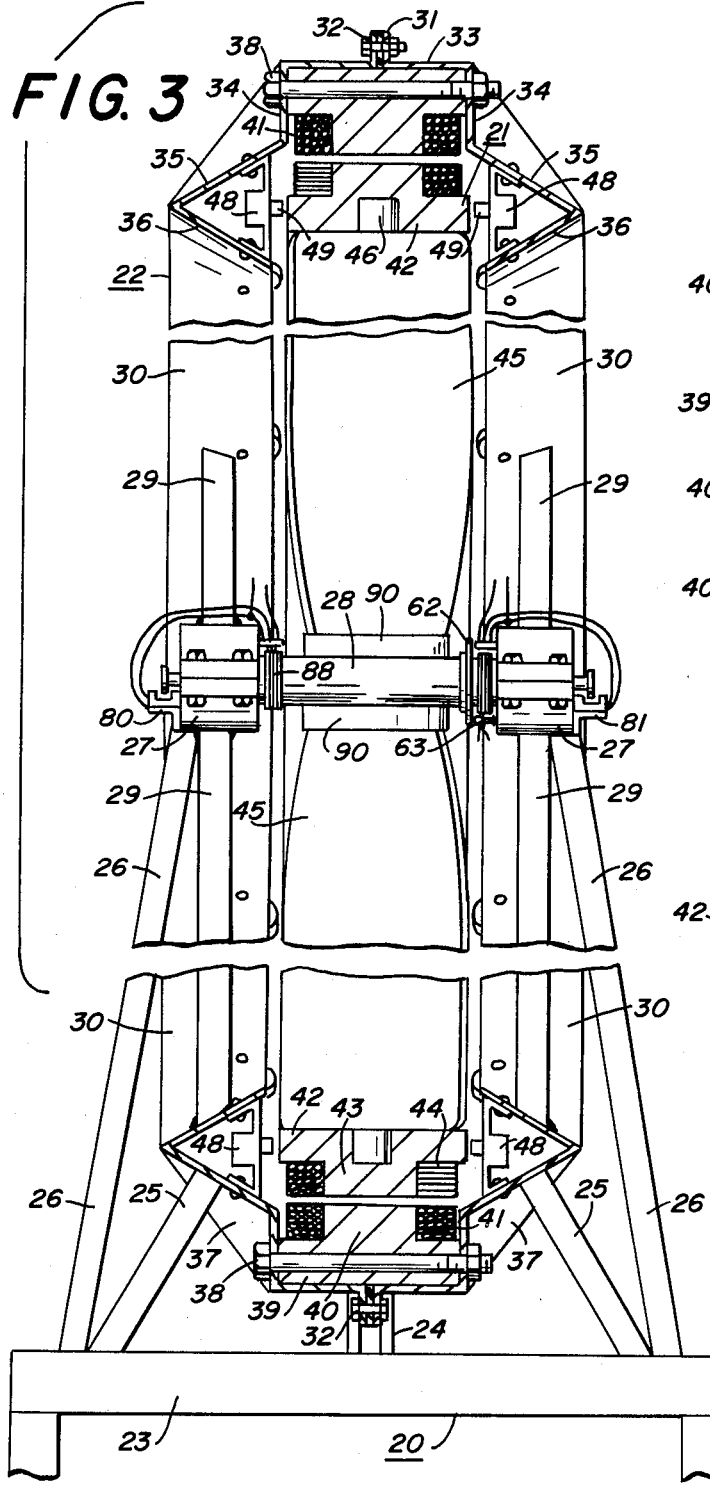

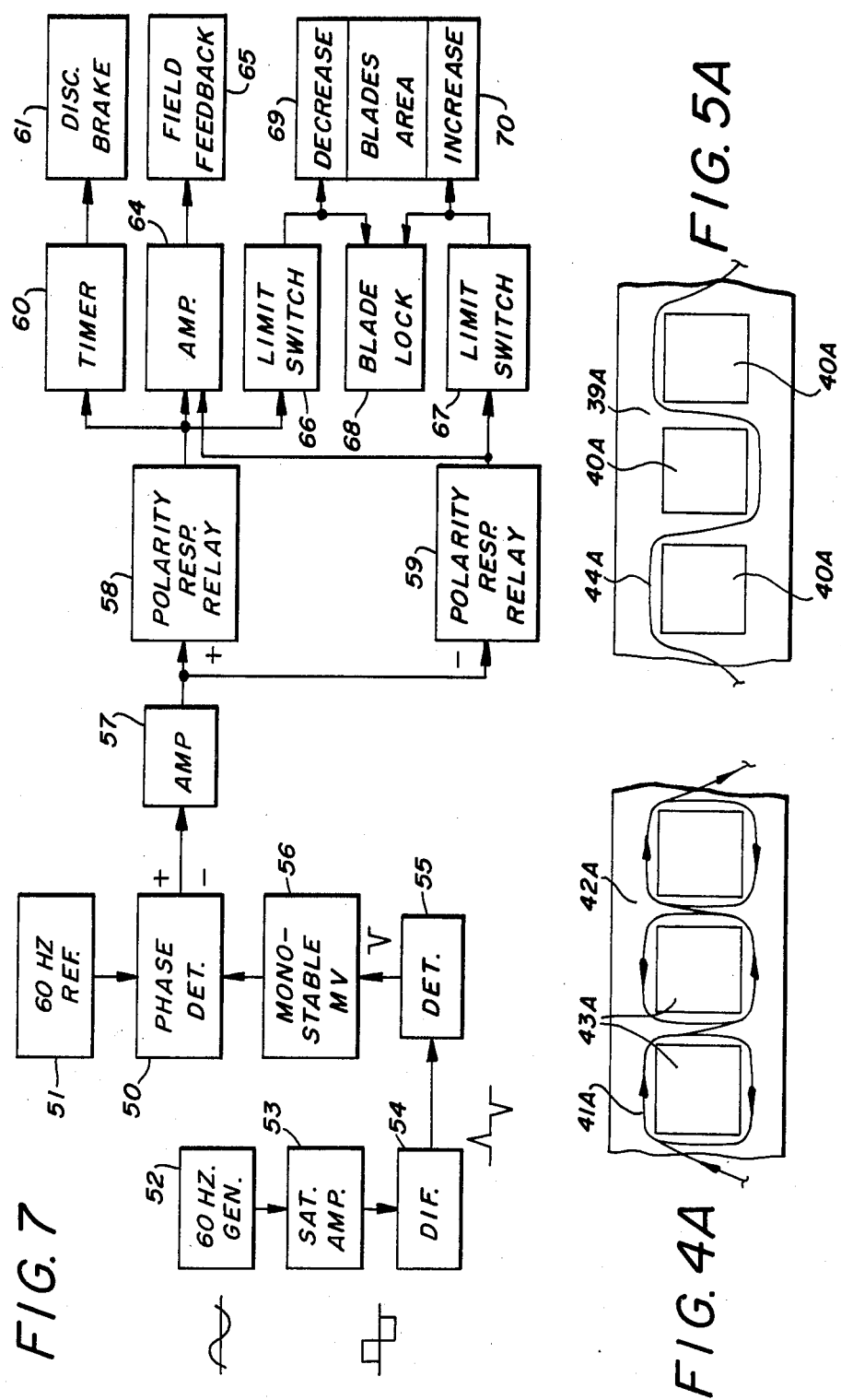

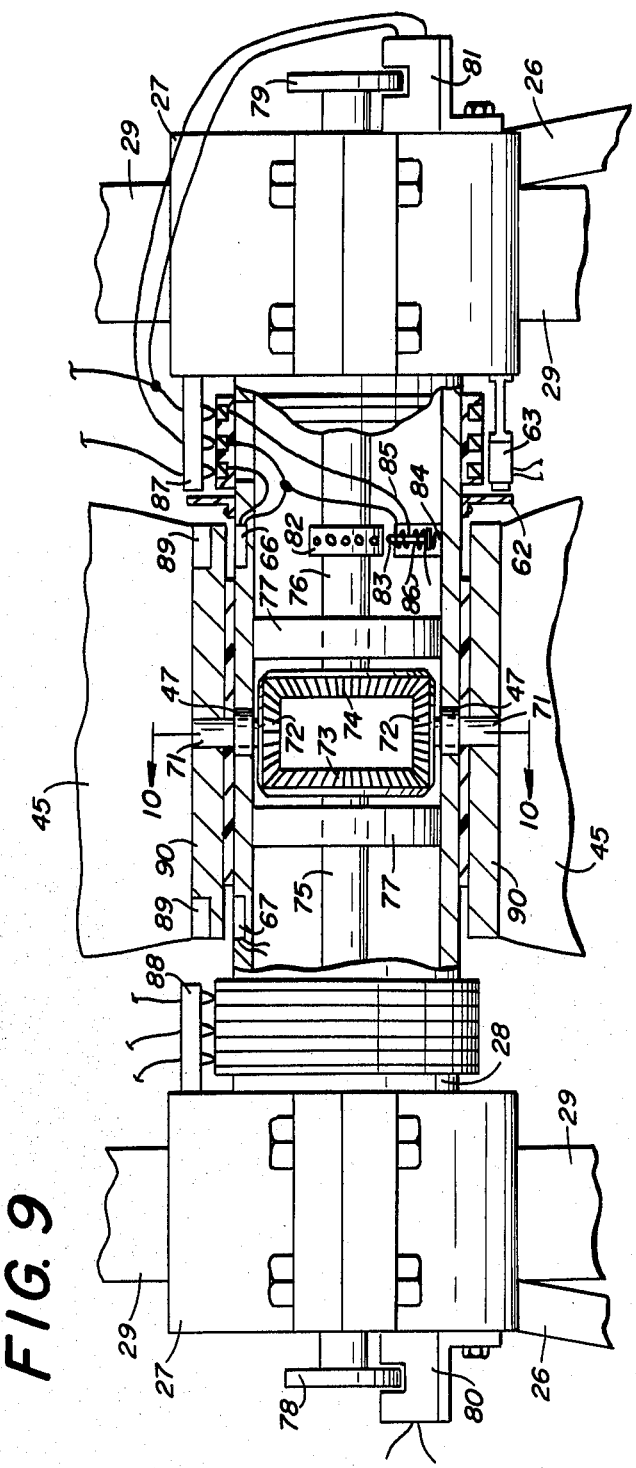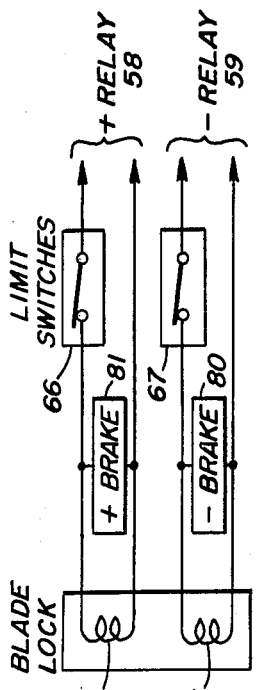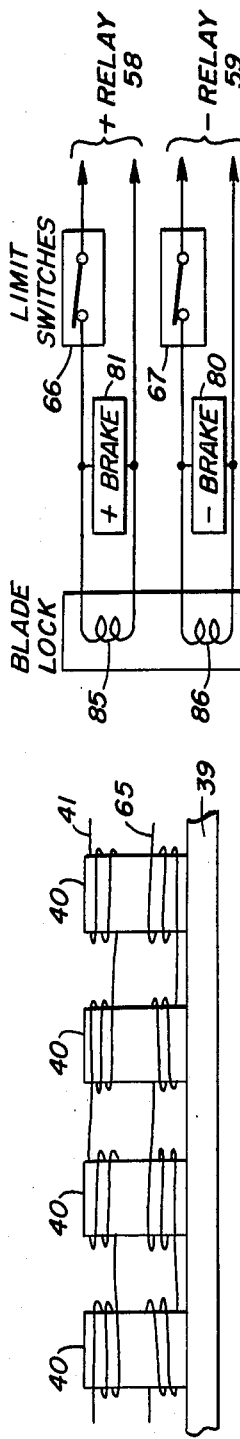

WIND POWERED ELECTRICAL GENERATOR

TECHNICAL FIELD

This invention relates to sinusoidal alternating current electrical generators, and more particularly relates to electrical generators in which the prime mover for the generating mechanism is wind power.

BACKGROUND ART

All of the prior art discovered by search in the U.S. Patent and Trademark Office is as follows:

| U.S. Pat. No. | Patentee | Granting Date |
| --- | --- | --- |
| 889,883 | E. J. Johnson | June 2, 1908 |
| 1,233,232 | A. H. Heyroth | July 10, 1917 |
| 1,334,485 | C. D. Clipfell et al | Mar. 23, 1920 |
| 1,352,960 | A. H. Heyroth | Sept. 14, 1920 |
| 1,894,357 | G. Manikowske et al | Jan. 17, 1933 |
| 1,944,239 | H. Honnef | Jan. 23, 1934 |
| 2,144,719 | H. Geffcken | Jan. 24, 1939 |
| 3,740,565 | N. G. Wesley | June 19, 1973 |

The field of search was
U.S. Class 290, subclasses 43, 44, 54, 55
U.S. Class 415, subclasses 2,4
U.S. Class 416, subclasses 3, 90A, 197A

DISCLOSURE OF INVENTION

Wind powered electrical generators have been designed in the past and are a continuing subject of interest as sources of power because they are non-polluting and do not require use of fossil fuels or nuclear sources as prime movers for driving the electrical generator system. Most forms of wind powered electrical generators utilize windvane structures in the form of wheels rotating about a central shaft axis in which the rotation of the wheel is mechanically transmitted to a conventional type electrical generator for producing an electrical output.

Other forms of wind powered electrical generators have been devised in the past in which the armature winding is located about the perimeter of the wind driven wheel and the field structure is located proximate to the armature. It is this latter form of wind driven electrical generator construction with which the present invention is concerned. The structures of this type disclosed by the known prior art have serious technical drawbacks in that there is provided no structural support for the wind driven wheel at its perimeter, and since the windwheels contemplated for use may be on the order of twenty to fifty feet in diameter, the bearing stresses developed at the supporting shaft under possible conditions of wind loading are so large that the required physical structure becomes economically unfeasible. This same wind loading problem reflects outward into a requirement for extremely high structural strength in the windwheel which results in high mass structures which militate against effective movement of the windwheel under normally available wind conditions. The structures of the windwheels must necessarily be designed to withstand very high wind gust forces even though the average wind velocity will be very much lower than the gust velocities.

The present invention overcomes this problem in past structures by providing a fixed strong structure extending perimetrally around the windwheel and providing low friction lateral support for the windwheel under operating conditions. As a consequence, a far less massive windwheel structure is utilizable which is responsive to relatively light winds and is considerably less costly to build.

Additionally, the electrical output of the wind powered generator according to the invention is monitored and compared against a reference standard to generate error signals when the phase of the generated electrical signal differs from that of the reference standard. The error signals so generated are utilized to control corrective mechanisms for reducing the error voltage towards zero. These corrective mechanisms which form also part of the invention are means for changing the angle presented by the windwheel blades to the wind in order to appropriately increase or decrease the velocity of the windwheel; the use of a braking structure to slow down the windwheel when appropriate; and when an electrical field winding is utilized, for controlling current in a feedback field winding.

In the illustrated form of the invention, the armature winding is carried by the windwheel at its perimeter and is shown as a wave winding which produces high voltages that may be subsequently transformed to lower voltages at higher currents. A lower voltage winding, such as a lap winding, may also be used if desired. The field structure is also a ring structure which lies just radially outward of the armature winding and is carried by the fixed housing structure which perimetrally surrounds the windwheel. This configuration minimizes clearance changes between the armature and the field structures due to wind loading of the windwheel, and also helps to mechanically stabilize the windwheel due to the magnetic field configuration. None of the known prior art discloses any of the foregoing features of the invention.

The electrical output from the wind driven electrical generator may be used as direct auxiliary electrical power or may be used as a source of energy to be converted into other forms for storage, such as in a heat retaining medium or in electrical form by charging large scale storage batteries.

A primary object of the invention is to provide a novel wind powered electrical generator in which the armature and field structures are located at the periphery of a wind drivable wheel, and in which the windwheel is of relatively light mass construction and is mechanically stabilized at its periphery.

Another object of the invention is to provide a novel wind powered electrical generator as aforesaid which includes means for stabilizing the voltage and frequency of the generator output by controlling the rotational speed of the windwheel and the excitation of the field windings.

A further object of the invention is to provide a novel wind powered electrical generator as aforesaid wherein the means for controlling the rotational speed of the windwheel includes means for controlling the pitch of the windwheel vanes, and means for electrically magnetically or mechanically loading the windwheel to draw off power.

BRIEF DESCRIPTION OF DRAWINGS

FIG. 3 is an enlarged broken sectional view of the generator according to the invention as would be seen along line 3—3 of FIG. 1;

FIG. 4 is a diagrammatic plan view of a portion of the field winding structure showing the winding directions;

FIG. 4A is an alternative showing to that of FIG. 4;

FIG. 5 is a diagrammatic plan view of a portion of the armature winding structure illustrating a wave winding;

FIG. 5A is an alternative showing to that of FIG. 5;

FIG. 7 is a functional block diagram of the system for controlling the output of the electrical generator according to the invention;

FIG. 8 is a fragmentary side view of the field structure showing both main field and feedback windings;

FIG. 9 is an enlarged view of the support shaft region of the generator shown in FIG. 3 with some parts being in section to disclose details of the shaft brake and windvane rotation mechanisms;

FIG. 11 is a schematic diagram of a part of the electrical control circuit for the windvane rotation system.

BEST MODE FOR CARRYING OUT THE INVENTION

Figure 1:
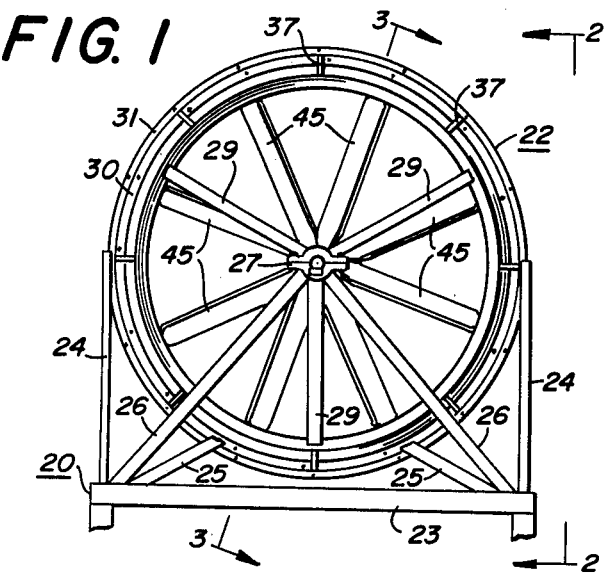
FIG. 1 is a front elevation of the wind powered electrical generator according to the invention.
Figure 2:
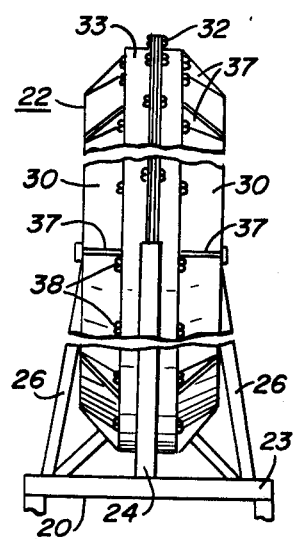
FIG. 2 is a broken view side elevation of the generator according to the invention as would be seen when viewed along line 2—2 of FIG. 1.

Referring first to FIGS. 1, 2 and 3 there is seen the overall structure of the wind powered electrical generator according to the invention. The structure consists basically of a structural support designated generally as 20, a windwheel 21 carrying the generator armature, and a supporting shroud 22 peripherally surrounding the windwheel 21 and carrying the generator field structure, both the windwheel 21 and support shroud 22 being mechanically carried by the structural support 20. The structural support 20 includes a base or platform 23 upwardly from which extend to supporting engagement with the shroud 22 a pair of side support struts 24 and bottom struts 25. Also secured to and extending upwardly from the base 23 are two pairs of struts 26 which converge at the windwheel axis on opposite sides of the windwheel to carry the bearings 27 within which is journalled opposite ends of the windwheel shaft 28. Also secured to and extending radially outward from the shaft bearings 27 on each side of the windwheel are three additional shroud struts 29 which are rigidly secured to the shroud 22, as for example by welding or any other suitable means. The base or platform 23 is carried at the top of a tower, not shown, by a mechanism which affords rotation of the generator structure about a vertical axis for a proper orientation with respect to the then prevailing winds. The means for effecting such orientation of the generator structure does not constitute a part of the present invention.

The supporting shroud 22 consists of a pair of identical annular oppositely facing rims 30 each having an outwardly radially extending flange 31, which flanges, as best seen in FIGS. 2 and 3, abut one another about the entire periphery of the shroud and are secured together as by bolts and nuts 32. The shroud rim flanges 31 are disposed within a slot portion of the side support struts 24 which latter are in the form of channel structures.

The secured together shroud rims form a three sided open rectangular annular channel immediately radially inward of the rim flanges 31, this channel consisting of an outer base wall 33 and a pair of spaced apart opposite side walls 34. Extending in opposite directions axially outwardly from the open end of each of the sidewalls 34 is a radially inwardly facing annularly extending wall 35 which reverses and turns back axially and radially inwardly as the annularly extending walls 36. The annular walls 35 and 36 direct the air flow to provide a streamlining minimal wind resistance load to the wind. Formed or otherwise rigidly secured to the annular walls 35 and sidewalls 34 are the rigidifying triangular gussets 37.

Secured within the open channel formed by the shroud base walls 33 and sidewalls 34 by means of the bolts and nuts 38 is an annular field poles base plate 39 carrying a large number of radially inwardly extending field poles 40 about which are wound the generator field windings designated generally as 41. The diagrammatic showing of FIG. 4 illustrates the manner in which the main field winding 41 is wound, the winding direction being illustrated by the arrowheads. Accordingly, if the arrowheads also designate the direction of field current flow, it will be observed that an alternating series of south and north poles is created about the circular inner perimeter of the field pole structure.

Figure 6:
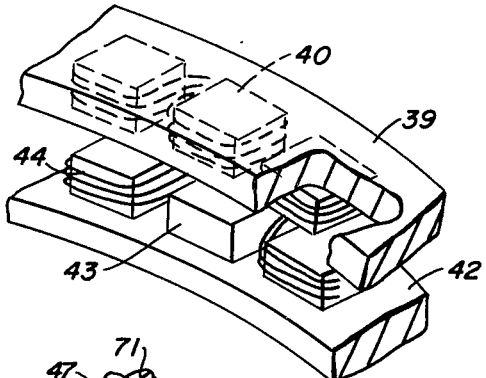
FIG. 6 is a fragmentary perspective view of portions of the windwheel armature structure and field structure.

Disposed immediately radially within the inside perimeter of the circular annular field pole structure is the generator armature structure consisting of the armature base plate 42 from which radially outwardly project the armature winding support pillars 43 about which are wound the armature winding 44. This structure is shown diagrammatically in the showing of FIG. 5. The annular armature base plate 42 is positionally mechanically stabilized by a plurality of windvanes 45 the outer ends of which are journalled for rotation in bearings 46 which are set into the armature base plate 42, the opposite ends of the windvanes 45 being similarly journalled for rotation in bearings 47 set into the central generator shaft 28, as best seen in the showing of FIG. 9. FIG. 6 shows a diagrammatic fragmentary perspective view of the field poles and armature structures of the generator.

Wind loading stress on the shaft bearings 27 is greatly reduced by utilizing a plurality of low friction rolling bearings carried by the supporting shroud 22 in the space between the annular walls 35 and 36, the bearings being secured to those walls and designated as 48. Each bearing 48 has a low friction rolling portion 49 projecting toward the side face of the armature base plate 42, as best seen in the showing of FIG. 3. The clearance between the armature base plate 42 and the bearings 49 is arranged so that under light wind loadings there will be no contact between the two, but under heavy wind loadings tending to cause the armature to move in a downwind direction, the armature base plate or ring 42 will engage the rolling bearings 49 and relieve the torsional load from the shaft bearings 27.

FIGS. 8, 9, 10 and 11 illustrate some of the detailed mechanisms for stabilizing the voltage and frequency of the alternating current output of the generator, but before referring thereto for the mechanical and electrical details, it will be more conducive to an understanding of the invention to first refer to the functional logic diagram of FIG. 7. The philosophy of FIG. 7 is to sample the output of the wind driven electrical generator and compare its frequency with that of a reference waveform to generate an error signal when the frequency of the wind driven generator varies from that of the reference standard, generating a positive error signal when the wind driven generator is generating a waveform of higher frequency than the reference, and generating a negative error signal when the frequency of the wind driven generator output waveform is lower than that of the reference waveform. The error signals are then utilized to actuate mechanisms for returning the generated output waveform toward the reference standard frequency by automatically actuating the devices to be described.

Referring now to FIG. 7 there is shown a phase detector 50, one input of which comes from a reference standard, in this case designated as a 60 Hertz reference 51. The other input to the phase detector is initiated by the output signal of the wind driven electrical generator, shown as a 60 Hertz generator 52. The frequency of the waveform generated by the wind driven electrical generator is determinable from the following formula:

$$f = (Np \times RPM)/120$$

where
 f = frequency in Hertz
 Np = number of field poles
 RPM = revolutions per minute of windwheel This could for example be achieved by a windwheel having a field structure of one hundred eighty poles and rotating at forty revolutions per minute. For a windwheel of twenty feet diameter, there would be approximately three field poles per foot of circumference. The output of the wind driven electrical generator 52 is sampled and the sample used to drive a saturating amplifier 53 to square the waveform, this waveform then being differentiated in differentiator 54 and passed through a detector 55 to generate a trigger pulse for triggering monostable multi-vibrator 56 which produces the second signal into the phase detector 50.

If the frequency of the wind driven electrical generator 52 is the same as that of the reference standard 51, then the phase detector will produce no error voltage since no corrective steps need be undertaken. If however the frequencies of the reference standard and the wind driven electrical generator differ, the phase detector will produce a positive or negative error signal which is then increased in power by amplifier 57 and routed to the polarity responsive relays 58 and 59. If the error signal is a positive error signal, relay 58 will respond to it, whereas if the error signal is a negative error signal relay 59 will respond to it.

Considering first the condition of a positive error signal being generated indicating that the windwheel is being driven at too fast a speed of rotation, it is necessary to reduce the speed to reduce the error voltage toward zero. Two systems are illustrated for speed reduction, both or one of which may be utilized either simultaneously or in staged sequences as desired. The first system utilizes the timer 60 and disc brake 61, the disc of the disc brake being shown in FIGS. 3 and 9 as the element 62 fixedly secured to and rotatable with the main shaft 28, while the electrically actuated caliper structure is designated as 63 and is shown fixedly secured to the shaft bearing structure. Any desired type of braking structure may be utilized and at any convenient point. For example, more effective braking may more conveniently be accomplished out at the rim of the windwheel than at the shaft position, but the illustrated structure is shown merely for purposes of illustration.

Since the windwheel is characterized by a relatively large momentum due to its size and mass, it is not desired to apply the disc brake on a continuous basis because if the brake were to be applied until the error signal diminished to zero, the decreasing momentum of the wheel could cause the rotational velocity to slow beyond the zero error signal generation point and would result in a negative error signal. The disc brake is therefore applied intermittently by means of the timer 60. If desired, sophisticated systems could be utilized to sample the rate of change of the error signal and control the brake accordingly.

The second automatically operating system utilizes both the positive and negative error signals and includes the amplifier 64 and field feedback winding 65. The field feedback winding is also shown in FIG. 8 which illustrates the winding 65 being wound in opposition to the main field winding 41. The field feedback system is not directed toward controlling the frequency, but rather toward controlling the amplitude of the output signal. A consequence of increased or decreased generator rotational velocity will be increased or decreased voltage amplitude at the output, and this is also not a desired condition. By decreasing or increasing the field excitation, and hence the magnetic flux, the generated output voltage can be reduced or increased. Design of the field feedback winding and associated driving circuitry for maintaining substantially constant output is a function of the electrical and mechanical design of a particular windwheel generator and the parameters associated with such a structure.

The third automatically operating system is also a system for controlling the velocity of the windwheel and is a system for automatically changing the pitch of the windvanes in the windwheel. When a positive error signal is present, indicating too high a rotational velocity of the windwheel, the pitch of the blades of the windvanes is decreased to reduce the drive on the windwheel. Conversely, when the error signal generated is negative, indicating too low a velocity of the windwheel, the pitch of the blades of the windvanes is automatically increased to thereby increase the driving force on the windwheel which is generated by the wind.

This system is shown diagrammatically in FIG. 7 in which the outputs of the relays 58 and 59 respectively pass through limit switches 66 and 67 to actuate a blade lock 68 to unlock the blades rotation restraint and simultaneously actuate either the blades area decrease mechanism 69 or the blades area increase mechanism 70. The limit switches 66 and 67 are utilized to limit the degree of rotation of the windvanes blades since there is a point of maximum blade area and a point of minimum blade area for development of maximum and minimum driving forces on the windwheel. Since the development of maximum driving force on the windwheel does not coincide with the presentation of maximum blade surface to the wind, there is a point beyond which the windvanes should not be rotated for the purpose of developing maximum drive, continued rotation past such a point necessarily resulting in a reduced drive on the windwheel. The function of the limit switches is therefore to only permit rotation of the blades of the windvanes up to a maximum amount in a given sense and to then disable the blade rotation mechanisms so that further rotation cannot occur.

The blade lock structure illustrated and to be described in connection with the showing of FIG. 9, maintains the windvanes locked fixedly in their adjusted position, whatever it may be under normal driving circumstances. When the automatic system functions to change the windvanes blade area, the blade lock mechanism 68 is unlocked so that the windvanes may be rotated under control of the appropriate polarity error signal. Rotation of the windvane blades is also permitted only so long as the limit switches are closed, and is carried out, as also to be subsequently described, in connection with the showing of FIGS. 9, 10 and 11, by utilization of a pair of electrically actuated brakes which independently and non-simultaneously control a differential structure which rotates the blades of the windvanes in a manner to be described.

Figure 10:
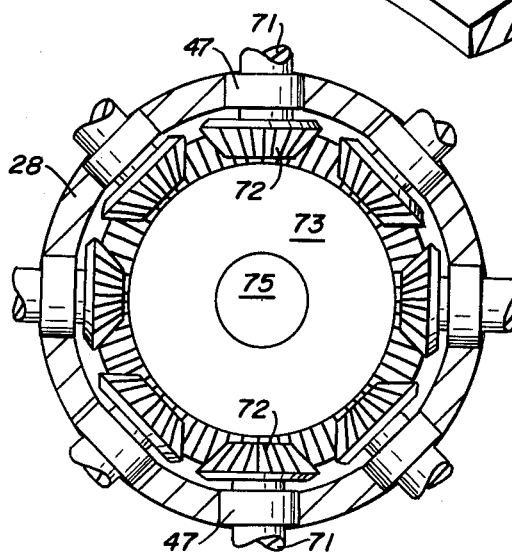
FIG. 10 is a cross-sectional view through the windvanes differential structure as would be seen when viewed along line 10—10 of FIG. 9.

Referring now to FIGS. 9, 10 and 11, it is observed that each of the illustrated pair of diametrically opposite windvane blades 45 is rotatable about a longitudinally extending central axis by means of blade shafts 71 which each pass through one of the bearings 47 and have affixed to their inner ends a pair of pinion gears 72. The pinion gears are engaged in a differential arrangement with a pair of bevel gears 73 and 74, which latter are respectively fixedly secured on a pair of shafts 75 and 76 which extend through bearing blocks 77 and axially outward through shaft 28 and shaft bearings 27 to terminate respectively in a pair of disc brake rotors 78 and 79. The rotor 78 cooperates with an electrically actuatable brake caliper assembly 80 while the rotor 79 cooperates with an electrically actuatable brake caliper assembly 81.

From FIG. 10 it will be observed that the blade pair shown in FIG. 9 as identified by blade bearings 47 and shafts 71 is only one pair of blades in the windwheel, and that there are three additional pairs of windwheel blades which each also include a pair of pinion gears engaged with the bevel gears 73 and 74. Accordingly, relative movement of the bevel gears 73 and 74 will cause rotation of all of the pinion gears in the windwheel. Moreover, because of the differential action, when pinion gears 73 and 74 counter-rotate with respect to one another, the diametrically opposite blades of each windwheel pair will rotate in opposite directions with respect to each other as is required. This rotation is effected by actuation of either the brakes 80 or 81 but not both simultaneously. The rotational operation is best seen from the showing of FIG. 9 by considering what occurs when one of the brakes is actuated and the other remains unactuated.

Consider first what occurs when brake caliper 81 is energized to thereby grasp the brake rotor 79. Since the caliper 81 is fixed to the main shaft bearing 27, rotor 79 and consequently shaft 76 and bevel gear 74 are slowed or brought to a stop with respect to the bearing 27. However, since the windwheel is rotating, shaft 28 upon which are mounted the blades 45 of the windvanes, is rotating. Accordingly, with bevel gear 74 fixed and shaft 28 rotating about it, the pinion gears 72 must rotate as the shaft 28 moves around the fixed bevel gear 74. This is possible because bevel gear 73 is free to rotate since brake caliper 80 is not actuated.

From FIG. 9 it will be observed that the upper pinion gear 72 will rotate in one direction while the lower pinion 72 will rotate in the opposite direction, thereby causing the pair of blades 45 to counter-rotate relative to one another in a first sense. Similarly, it will be understood that the blades 45 will rotate in the opposite sense in the circumstance where brake caliper 80 is actuated and brake caliper 81 is nonactuated. Thus, provision for varying the pitch of the windvanes in both directions is provided for in order to increase or decrease the driving force transmitted to the windwheel by the wind.

Moreover, as for the case of the disc brake 61, it may be desirable or necessary because of inertia forces to rotate the windvanes blades intermittently. If such is found to be the case for particular design situations, an intermittent timer similar to that illustrated at 60 may be utilized in series with each limit switch, or some other appropriate device may be used.

The blade lock device for maintaining the windvanes blades in a particular pitch position is shown in FIG. 9 and consists of the collar 82 fixedly secured about shaft 76 which cooperates with a locking pin 83 normally spring loaded into engagement with the collar 82 by means of spring 84. Locking pin 83 is normally engaged in one of the number of peripherally extending detent sockets spaced about the blade lock collar 82 but is shown in retracted position in FIG. 9 to permit rotation of the windvanes blades. Retraction of the locking pin 83 is done in solenoid fashion by energization of either one of the windings 85 or 86. The blade lock winding 85 and the brake caliper 81 are energized from the polarity responsive relay 58 through limit switch 66 and slip ring assembly 87, whereas blade lock winding 86 and brake caliper 80 are energized from polarity responsive relay 59 through limit switch 67 and slip ring assembly 88.

The limit switches 66 and 67 may typically be reed type switches mounted at the shaft 28 and actuated by magnets 89 mounted at suitable positions in the circular discs 90 which constitute a portion of the windvanes blade structure proximate to the shaft 28. As the blades 45 rotate they approach their limiting positions and rotate the magnets 89 into apposition with the limit switches 66 and 67 as a function of the direction in which the blades are rotated. When one of the magnets 89 reaches its actuating position it causes the associated limit switch to open and thereby deenergizes the associated brake 80 or 81 and the blade lock retracting mechanism. Accordingly, with the brake deenergized no further rotation of the windvanes blades can occur and the blade lock is immediately set to prevent undesired rotation of the windvanes blades due to wind action. The electrical schematic operation of this system is shown in FIG. 11.

Although the armature output winding has been shown as part of the rotor, and the field structure has been shown as part of the stator, these structures can be interchanged so that the power output winding is constructed as part of the stator and the field structure as part of the rotor. In the drawings this is illustrated in FIGS. 4A and 5A which respectively show a field winding 41A wound about field poles 43A carried on the windwheel rotor base plate 42A, and an armature winding 44A wound about support pillars 40A carried by the stator base plate 39A. In some applications it may also be desirable to utilize a permanent magnet field structure instead of a self-excited field structure.

Having now described my invention in connection with a particularly illustrated embodiment thereof, modifications and variations may now occur to those persons normally skilled in the art without departing from the essential scope or spirit of the invention, and accordingly it is intended to claim the same broadly as well as specifically as indicated by the appended claims.

I claim:

1. A wind powered alternating current electrical generator of the type having a rotatable wind wheel generator rotor consisting of a circular rim carrying one of the armature or field structures and a plurality of angularly spaced radially extending windvanes connecting the rim to a rotatable central shaft, a stator carrying the other of the armature or field structures and past which the windwheel rotor rim rotates, and a supporting structure for the windwheel rotor and the stator, characterized in that the stator extends concentrically closely peripherally completely around the rotor substantially co-planar therewith and radially outward therefrom.

2. The generator of claim 1 wherein said supporting structure carries low friction bearing means engageable with said rotor proximate to the outer perimeter thereof and effective under wind loading conditions to minimize lateral thrust and torsional stresses on the bearings supporting the rotatable central shaft.

3. The generator of claim 1 wherein said supporting structure encloses the generator field and armature structures within an annular low wind resistance housing.

4. The generator of claim 1 wherein at least some of the windvanes are each rotatable along an axis extending longitudinally of each such windvane from root to tip between the rotor central shaft and rotor rim, and wherein the generator further includes control means effective to selectively rotate said rotatable windvanes.

5. A wind powered alternating current electrical generator of the type having a rotatable wind wheel generator rotor consisting of a circular rim carrying one of the armature or field structures and a plurality of angularly spaced radially extending windvanes connecting the rim to a rotatable central shaft, a stator carrying the other of the armature or field structures and past which the windwheel rotor rim rotates, and a supporting structure for the windwheel rotor and the stator, characterized in that at least one of said supporting structure and stator carries low friction bearing means engageable with said rotor proximate to the outer perimeter thereof and effective under wind loading conditions to minimize lateral thrust and torsional stresses on the bearings supporting the rotatable central shaft.

6. The generator of claim 1 further including actuatable first control means for increasing within limits and decreasing the rotational velocity of the rotor.

7. The generator of claim 1 further including output waveform amplitude control means for controlling within limits the amplitude of the electrical output signal.

8. The generator of claim 1 wherein the armature structure is carried by the rotor rim and the field structure is carried by the stator.

9. The generator of claim 2 wherein said bearing means are plural and are spaced at intervals around the circumference of the rotor.

10. The generator of claim 2 wherein said bearing means are plural, are spaced at intervals around the circumference of the rotor, and are disengaged from said rotor when said rotor rim is in an axially non-deflected position with respect to the rotor central shaft, and at least some of which bearings means are engaged with said rotor when said rotor rim is axially deflected with respect to the rotor central shaft.

11. The generator of claim 4 wherein said control means comprises,
(a) sensing means for sensing when the frequency of the generated electrical output is different from a desired reference frequency, for generating a first control signal when the sensed output frequency is higher than the reference frequency, and for generating a second control signal when the sensed output frequency is lower than the reference frequency,
(b) first actuating means effective responsive to said first control signal to rotate said rotatable windvanes in a first sense to reduce the wind driving force on the rotor and reduce its rotational velocity,
(c) second actuating means effective responsive to said second control signal to rotate said rotatable windvanes in a second sense opposite to said first sense to increase the wind driving force on the rotor and increase its rotational velocity.

12. The generator of claim 4 wherein said control means further includes rotatable windvanes positional sensing means effective to sense at least one discrete preselected rotational position of said windvanes, and responsive to sensing said discrete rotational position to disable said control means from rotating said windvanes in a first sense beyond said discrete position but not disable said control means from rotating said windvanes in a second sense opposite to said first sense.

13. The generator of claim 4 wherein said control means comprises,
(a) a differential structure having a pair of parallel facing spaced apart bevel gears and a plurality of pinion gears each of which is spaced between and drivingly engaged with both bevel gears, said pinion gears being spaced peripherally around said bevel gears and being each coupled at its gear rotation axis to a windvane at the root end rotation axis of the latter, whereby when said pair of bevel gears relatively counter rotate, said pinion gears and windvanes rotate,
(b) first actuatable means coupled to one of said pairs of bevel gears effective when actuated to cause said bevel gears to relatively counter rotate in a first sense to thereby cause said windvanes to rotate in a first sense about their longitudinal rotational axes,
(c) second actuatable means coupled to the other of said pair of bevel gears effective when actuated to cause said bevel gears to relatively counter rotate in a second sense opposite to said first sense to thereby cause said windvanes to rotate in a second sense opposite to said first sense about their longitudinal rotation axes, and
(d) actuating means for non-simultaneously selectively actuating said first or second actuatable means.

14. The generator of claim 6 wherein said first control means for decreasing the rotor velocity comprises a rotor braking device.

15. The generator of claim 6 wherein said first control means for increasing and decreasing the rotor velocity comprises rotatable windvanes and means coupled thereto for rotating the same to respectively increase or decrease of wind force on the windvanes.

16. The generator of claim 7 wherein the generator field structure is electromagnetic, and said output waveform amplitude control means comprises means for modulating the magnetic poles field strength to decrease the field strength when the generator output waveform amplitude increases and to increase the field strength when the generator output waveform amplitude decreases.

17. The generator of claim 11 wherein said control means further comprises windvanes positional locking means effective to lock said rotatable windvanes against rotation in any of a plurality of windvanes positions, said windvanes locking means being operative responsive to either of said first or second control signals to release said windvanes for rotation.

18. The generator of claim 13 wherein said differential structure is disposed within the rotor central shaft with the bevel gears coaxial with the axis of rotation of said rotor shaft and normally rotatable with said shaft, and wherein said first and second actuatable means each comprises means when actuated for effecting relative rotation between its associated bevel gear and said rotor shaft.

19. The generator of claim 13 wherein said control means further includes actuatable windvanes locking means effective when deactuated to lock said windvanes against rotation about their longitudinal rotation axes and effective when actuated to release said windvanes for rotation about their longitudinal axes and wherein said actuating means actuates said windvanes locking means simultaneously with actuation of said first or second bevel gears actuatable means.

20. The generator of claim 16 wherein said output waveform amplitude control means includes sensing means which sense the rotor rotational velocity, said sensing means decreasing the field strength to decrease the output amplitude when the rotor rotational velocity is higher than a predetermined reference velocity and said sensing means increasing the field strength to increase the output amplitude when the rotor rotational velocity is lower than the predetermined reference velocity.

21. The generator of claim 6 further including output waveform amplitude control means for controlling within limits the amplitude of the electrical output signal.

22. The generator of claim 21 wherein the generator field structure is electromagnetic, and said output waveform amplitude control means comprises means for modulating the magnetic poles field strength to decrease the field strength when the generator output waveform amplitude increases and to increase the field strength when the generator output waveform amplitude decreases.

23. The generator of claim 5 wherein at least some of the windvanes are each rotatable along an axis extending longitudinally of each such windvane from root to tip between the rotor central shaft and rotor rim, and wherein the generator further includes control means effective to selectively rotate said rotatable windvanes.

* * * * *